United States Patent [19]

Detlefsen et al.

[11] Patent Number: 5,059,488
[45] Date of Patent: Oct. 22, 1991

[54] GLUTARALDEHYDE RESIN BINDING SYSTEM FOR MANUFACTURE OF WOOD PRODUCTS

[75] Inventors: William D. Detlefsen; David Wen-I-Shiau, both of Eugene; Nicholas K. Daisy, Springfield, all of Oreg.

[73] Assignee: Borden, Inc., Columbus, Ohio

[21] Appl. No.: 573,389

[22] Filed: Aug. 24, 1990

[51] Int. Cl.$^5$ .............................................. B32B 21/08
[52] U.S. Cl. ................................... 428/528; 428/526; 428/537.1; 204/128; 156/331.3; 156/307.3; 528/264; 528/259
[58] Field of Search ............... 528/264, 259; 428/528, 428/526, 537.1; 264/128; 156/331.3, 307.3

[56] References Cited

U.S. PATENT DOCUMENTS

| | | | |
|---|---|---|---|
| 4,220,751 | 9/1980 | Peterson et al. | 528/232 |
| 4,395,504 | 7/1983 | Salzberg et al. | 524/14 |
| 4,478,966 | 10/1984 | Helgesson et al. | 264/128 |
| 4,536,245 | 8/1985 | Shiau et al. | 156/307.3 |
| 4,906,726 | 3/1990 | Cumings | 528/230 |
| 4,906,727 | 3/1990 | Fischer | 528/230 |

FOREIGN PATENT DOCUMENTS 37706  4/1980  European Pat. Off. .

*Primary Examiner*—Edith L. Buffalow
*Attorney, Agent, or Firm*—Kenneth P. Van Wyck; Dennis H. Rainear; George P. Maskas

[57] ABSTRACT

This invention relates to ethyleneurea-glutaraldehyde resins, urea-ethyleneurea-glutaraldehyde resins, their synthesis, as well as their application as an adhesive for wood panel manufacture. Molar ratio of ethyleneurea to glutaraldehyde can range from 0.3 to 3.5. Urea incorporated into ethyleneurea-glutaraldehyde resin can be high as two times the moles of glutaraldehyde used in the formulation and can be introduced at any stage during the reaction course, simply post added, or any combination of the above.

26 Claims, No Drawings

GLUTARALDEHYDE RESIN BINDING SYSTEM FOR MANUFACTURE OF WOOD PRODUCTS

BACKGROUND OF THE INVENTION

This invention relates to ethyleneurea-glutaraldehyde resins, urea-ethyleneurea-glutaraldehyde resins, their synthesis, as well as their application as adhesives for bonding lignocellulosic material such as for the manufacture of particleboard, plywood, hardboard, fiberboard, waferboard, oriented strandboard, and the like.

One of the major applications of urea-formaldehyde resins is as a binder for lignocellulosic material. Urea-formaldehyde resin is cheap and easy to use. It is colorless. Fast cure is also an advantage. Its chemical structure shows hydrolyzable methylene-ether linkages and methylol functions, which create the potential for giving off formaldehyde vapor after curing. Indeed, one of the disadvantages associated with urea-formaldehyde resin-bonded particleboard is that it slowly emits formaldehyde fumes. Due to environmental, health, and regulatory issues related to formaldehyde emissions from wood composite products, development of new adhesive systems which do not contain formaldehyde is of great interest.

Various compositions and methods have been developed to avoid formaldehyde release from adhesives in the manufacture of lignocellulosic panels. The Shiau et al U.S. Pat. No. 4,536,245 of Aug. 20, 1985 discloses urea-formaldehyde resins modified with melamine for use as a binder for such panels. The Salzburg et al U.S. Pat. No. 4,395,504 of July 23, 1983 shows a formaldehyde-free adhesive system for the manufacture of particleboard by the reaction product of a cyclic urea, e.g., ethyleneurea, and glyoxal. The instant invention shows advantageous properties over the use of an ethyleneurea-glyoxal resin. The instant invention uses an ethyleneurea-glutaraldehyde resin or a urea-ethyleneurea-glutaraldehyde resin to avoid the formaldehyde fumes. Other references are of less interest than the Salzburg et al patent. Thus, the Fisher et al U.S. Pat. No. 4,906,727 of Mar. 6, 1990 discloses a binder obtained by the reaction of urea or certain alkylene ureas with certain aldehydes. The Cummings patent, U.S. Pat. No. 4,906,726 of Mar. 6, 1990, discloses surface coatings prepared from complex mixtures which include the reaction product of polyaldehydes such as glyoxal or glutaraldehyde or derivatives thereof with urea. The Petersen et al U.S. Pat. No. 4,202,751 of Sept. 2, 1980 discloses resins prepared from urea and certain monoaldehydes which are disclosed as surface coating binders. The publication of European patent application 37,706 of Oct. 14, 1981 discloses a resin made from an ethyleneurea and formaldehyde for use as a flame retardant additive when in admixture with an ammonium phosphate.

SUMMARY OF THE INVENTION

Ethyleneurea-glutaraldehyde resins and urea-ethyleneurea-glutaraldehyde resins have now been developed which can be used in the manufacture of lignocellulosic material, e.g., particleboard. The molar ratio of ethyleneurea to glutaraldehyde in these resins can vary from about 0.3 to 3.5. Urea, which is used as a modifier to the ethyleneurea-glutaraldehyde resin system, can be added at up to two moles per mole of glutaraldehyde. Lignocellulosic materials bonded with these glutaraldehyde resins do not emit formaldehyde fumes. They have internal bond strengths and cure speeds comparable to those produced with the commercially available urea-formaldehyde resins.

With the resins of this invention, it is not necessary to use an external catalyst to achieve proper curing and acceptable bond strength. The resins of the instant invention cure faster than resins such as those of ethyleneurea and glyoxal and do not require external catalysts such as ammonium chloride to help in the resin cure.

DETAILED DESCRIPTION OF THE INVENTION

Ethyleneurea-glutaraldehyde resins of this invention are prepared by allowing ethyleneurea to react with glutaraldehyde. Water is preferably removed simultaneous to concentrate the product. Typically, the pH of a 25% glutaraldehyde aqueous solution is first adjusted to 6 or above with bases such as soda ash, sodium hydroxide, and TEA (triethanolamine) or their mixtures. The specific base used is not critical as long as the pH can be controlled. The glutaraldehyde solution is not necessarily limited to a concentration of 25%. This is simply a readily available concentration whereas such concentration can vary over a wide range such as that of an aqueous solution containing from about 5% to 60% by weight of glutaraldehyde. Ethyleneurea is then introduced to react with glutaraldehyde. The molar ratio of ethyleneurea to glutaraldehyde can be varied from about 0.3 to 3.5 and preferably between 1.3 and 2.0, with about 2.0 being the most preferred. The pH of the reaction mixture is conveniently from about 6.5 to 10.5 and is preferably between the range of 8.5 to 10.5. However, these pH ranges are convenient for control but should not limit the invention. The reaction can be carried out from about room temperature to reflux, with the preferred range being from about 40° C. to 75° C. and particularly from about 50° C. to 56° C. The reaction product will have a solids content varying over a wide range which is only limited by commercial practice. Thus, the solids can range from about 25% to 80% of the aqueous resin, preferably from about 45% to 75% and particularly from about 54% to 60% by weight of the resin. The pH of the product can vary from about 7.5 to 12.5.

Urea can be introduced to the ethyleneurea-glutaraldehyde reaction mixture to produce urea-ethyleneurea-glutaraldehyde resin. Incorporation of urea can be done at any stage during the course of reaction, ranging from allowing urea to react along with glutaraldehyde first, down to simple post addition of urea to the ethyleneurea-glutaraldehyde resin, and any combination of the above. The reaction conditions, solids content, and pH of the product when urea is used in the manufacture of the resin can be the same as set forth above for the ethyleneurea-glutaraldehyde resin. The amount of urea incorporated in the resin can be as much as about two times the moles of glutaraldehyde used in the formulation, preferably from about 0.1 to 2 moles and particularly from about 0.3 to 1.8 moles of urea per mole of glutaraldehyde. For economic reasons, it is generally preferred that the higher quantities of urea be used.

In the production of panels from veneers, particles, flakes, and other such material, a resin adhesive is generally sprayed or otherwise contacted with the lignocellulosic material. The veneers or wood particles are then formed into a mat. The mat is placed between two platens and under heat and pressure, the mat is formed into a panel, board, beam, etc. The heat plasticizes the mat and cures the resin while pressure compacts the separate pieces of wood to a higher density. Some of the techniques can differ in preparing panels from the different materials. Thus, particleboard is generally made by spraying the liquid resin onto wood furnish which is inside a rotating drum-blender, to ensure good mixing. The resin-treated furnish is spread evenly to form a 14.75"×14.75" mat, which is then typically hot-pressed at 300° to 400° F. and 450 to 600 psi to produce a particleboard having the desired density and thickness.

Although typical urea-formaldehyde resin catalysts like ammonium chloride and ammonium sulfate can be used to speed up the curing of the resins of this invention, such catalysts are not required to achieve proper curing and obtain acceptable internal bond strength.

The invention will be exemplified by the following demonstrations of the invention. In these demonstrations of the invention, as elsewhere in the specification, all temperatures are in degrees Celsius, and all parts are by weight, unless expressly stated to be otherwise.

EXAMPLE I

A. 533.2 grams (6.194 moles) of ethyleneurea were charged at room temperature to a round bottom flask containing 1240 grams (3.096 moles) of 25% glutaraldehyde aqueous solution and 3.3 grams of anhydrous soda ash. After dissolution, the pH of the reaction mixture was 7.9. The reaction mixture was heated and vacuum concentrated at 54°+/−2° C. Reaction was stopped after 559 grams of distillate had been removed. The product was a clear, apricot-colored liquid, which had a pH of 9.4, a viscosity of 190 cps (at 25° C.) and a solids content of 61.4%. This resin was then diluted with water to give a 58% solids content for particleboard manufacture. The boiling water gel test on a mixture of this resin and 1% of crystalline ammonium chloride based on liquid resin weight registered 1.3 minutes for gelation to occur. A description of the boiling water gel test is given in Example V.

B. 3610 grams of furnish having a moisture content of 4.5% were sprayed with 476 grams of the liquid resin (from A above) in a rotating drum-blender. 1634 grams of resin-treated furnish were spread evenly in a 14.75"×14.75" mold to form a mat, which was then hot pressed at 320° F. for 3 to 4.5 minutes to produce particleboards with a target thickness of 0.66". The internal bond strengths of the boards were found to be: 132 psi (3 min.), 188 psi (3.5 min.), 177 psi (4 min.), and 161 psi (4.5 min.). The procedure for conducting the internal bond test is set forth in Example III.

EXAMPLE II

A. In an identical manner as described in Example I, 405.2 grams (4.707 moles) of ethyleneurea, 1450 grams (3.621 moles) of 25% glutaraldehyde solution and 4.5 grams of anhydrous soda ash were allowed to react. After 710 grams of distillate were removed, a clear, apricot-colored resin was obtained which had a pH of 9.5, a viscosity of 500 cps (at 25° C.) and a solids content of 61.7%. The solids content was adjusted to 58% for particleboard manufacture. The boiling water gel time was found to be 1.3 minutes when the resin was catalyzed with 1% of crystalline ammonium chloride based on liquid resin weight.

B. The internal bond strengths of the particleboard made with this resin were found to be: 26 psi (3 min.), 99 psi (3.5 min.), 130 psi (4 min.), and 128 psi (4.5 min.).

EXAMPLE III

A. A resin was made by the same procedure as described in Example I, except that 1565.1 grams (18.180 moles) of ethyleneurea, 5600 grams (13.983 moles) of 25% glutaraldehyde solution and 17 grams of anhydrous soda ash were used. After 2650 grams of distillate were removed, a clear, golden resin was obtained which had a pH of 9.0, a viscosity of 180 cps (25° C.), and a solids content of 59.2%. The pH of this resin was adjusted to 10.8 with 25% sodium hydroxide and the resulting product was split into four portions. At room temperature, levels of 7.5%, 15%, and 30% of prilled urea (based on liquid resin weight) were added respectively to three of the four portions. Finally, the solids content of each product was adjusted to 58% for particleboard manufacture.

B. The internal bond strengths of particleboards made with these four products are tabulated as follows:

| Press Time (Min.) | Summary of the Averaged IB (psi) Data % Urea Post Added To Resin | | | |
|---|---|---|---|---|
| | 0 | 7.5 | 15 | 30 |
| 2.5 | 0 | 46 | 71 | 83 |
| 3.0 | 124 | 126 | 154 | 115 |
| 3.5 | 152 | 145 | 135 | 125 |
| 4.0 | 148 | 153 | 145 | 132 |

The IB (Internal Bond) data of the various examples herein is obtained by:

1. Cutting eight speciments, size 2"×2", out of the testing board;

2. Gluing the two largest sides of each specimen to two blocks;

3. Testing this specimen with the Tinius-Olsen machine under a constant pulling speed of 0.08" per minute;

4. Recording the load (in pounds) at the point where the specimen breaks; and

5. Converting the load into pounds per square inch (psi). Obtain the average of these eight test results as the IB data for this testing board. A zero "0" reading indicates that the specimen disintegrated or had no measurable internal bond strength.

The Internal Bond (IB) data in Example III table showed that post addition of urea to an ethyleneurea-glutaraldehyde resin (having a mole ratio of ethyleneurea to glutaraldehyde=1.30) up to 30% of its weight still produces good boards.

EXAMPLE IV

A. Using the same procedure described in Example I, 1207.1 grams (14.023 moles of ethyleneurea), 6240 grams (15.581 moles) of 25% glutaraldehyde solution, and 19 grams of anhydrous soda ash were allowed to react to produce a clear, golden resin which had a pH of 8.8, a viscosity of 290 cps (at 25° C.), and a solids content of 59.4%. This resin was split into four portions and post addition of prilled urea was carried out in exactly the same way as described in Example III. Solids were adjusted to 58% for particleboard manufacture.

B. The internal bond strengths of particleboard made with these four products are tabulated as follows:

Summary of the Averaged IB (psi) Data

| Press Time | % Urea Post Added To Resin | | | |
|---|---|---|---|---|
| (Min.) | 0 | 7.5 | 15 | 30 |
| 2.5 | 0 | 0 | 0 | 21 |
| 3.0 | 48 | 93 | 118 | 112 |
| 3.5 | 89 | 133 | 116 | 108 |
| 4.0 | 86 | 146 | 128 | 113 |

The IB data in Example IV Table clearly demonstrated the positive effect of post-adding urea to an ethyleneurea-glutaraldehyde resin (having a mole ratio of ethyleneurea to glutaraldehyde=0.90) on improving its IB performance.

EXAMPLE V

A series of tests were made which subjected ethyleneurea-glyoxal (EU-G) resin and ethyleneurea-glutaraldehyde (EU-GL) resin to the boiling water gel test (BWG). This test determines gel time with a Sunshine Gel Meter, Cat. No. 22, when the resin is immersed in a constant temperature boiling water bath. The test measures the time it takes the resin to gel at such temperature and is correlatable with cure time in that shorter gel times indicate a shorter cure time whereas longer gel times indicate a longer cure time. Briefly, to perform the test, a test tube containing a sample of resin is immersed in the constant temperature boiling water bath. A glass rod is suspended from the Sunshine Gel Meter into the liquid sample. The meter turns the rod at 1 RPM. As the resin thickens, a drag is created on the rod until at gel there is sufficient torque to trigger an alarm circuit signaling the end of the test.

It can be seen from the following table of Example V that at about the same pH, the glutaraldehyde resin gelled in a shorter period of times as compared to the glyoxal resin. In this regard, it would also be expected that lowering the pH of either of the resins would give shorter gel times. However, some of the glutaraldehyde resin samples with a relatively high pH had gel times shorter than glyoxal resins having a lower pH.

| Ethyleneurea-Glyoxal Resin (Mole ratio EU/G = 1.3/1.0) | | Ethyleneurea-Glutaraldehyde Resin (Mole ratio EU/GL = 1.3/1.0) | |
|---|---|---|---|
| pH of Test Sample | BWG (sec) | pH of Test Sample | BWG (sec) |
| 1.76 | 74 | 6.20 | 66 |
| 1.98 | 88 | 7.12 | 114 |
| 6.22 | 372 | | |

EXAMPLE VI

A series of tests were made which subjected an ethyleneurea-glyoxal resin (EU-G) and an ethyleneurea-glutaraldehyde (EU-GL) resin to the boiling water gel test wherein 15% by weight of urea was post added to the resin just prior to testing. It can be seen from the following table that the ethyleneurea-glutaraldehyde resin with post-added urea gelled much faster than the ethyleneurea-glyoxal resin with post-added urea.

| Ethyleneurea-Glyoxal Resin (Mole ratio EU/G = 1.3/1.0) | | Ethyleneurea-Glutaraldehyde Resin (Mole ratio EU/GL = 1.3/1.0) | |
|---|---|---|---|
| pH of Test Sample | BWG (sec) | pH of Test Sample | BWG (sec) |
| 5.33 | No gelatin after being heated for 25 minutes. | 6.49 | 65 |
| 1.77 | 48 | | |

EXAMPLE VII

Tests were made to determine the effect of urea as a coreactant with glutaraldehyde and ethyleneurea as well as with glyoxal and ethyleneurea. The tests and results were as follows:

A. One mole of glutaraldehyde was allowed to react with a mixture of 1.3 moles of ethyleneurea and 0.83 moles of urea. The finished product had a theoretical urea content of 13.1%. The BWG test result was 54 seconds for a sample of pH=6.51.

B. One mole of glyoxal was allowed to react with a mixture of 0.7 moles of ethyleneurea and 0.6 moles of urea. The theoretical urea content in this finished product was 14.7%. A test sample of pH=3.47 did not produce any gelation after being heated at 100° C. for 27 minutes.

What is claimed is:

1. A resin adhesive system which comprises an ethyleneurea-glutaraldehyde resin having a molar ratio of ethyleneurea to glutaraldehyde of from about 0.3 to 3.5.
2. The resin of claim 1 wherein the resin includes up to about 2 moles of urea for each mole of glutaraldehyde.
3. The resin of claim 1 wherein the molar ratio of ethyleneurea to glutaraldehyde is from about 1.3 to 2.0.
4. The resin of claim 1 having a pH of about 7.5 to 12.5 and a solids content of from about 45% to 75% by weight of the resin.
5. The resin of claim 1 having a pH of about 7.5 to 12.5 and a molar ratio of ethyleneurea to glutaraldehyde of 1.3 to 2.0.
6. A urea-ethyleneurea-glutaraldehyde resin having from 0.1 to 2 moles of urea and 0.3 to 3.5 moles of ethyleneurea for each mole of glutaraldehyde.
7. The resin of claim 6 which contains from about 0.3 to 1.8 moles of urea for each mole of glutaraldehyde.
8. The resin of claim 6 having a pH of about 7.5 to 12.5 and a solids content of about 45% to 75% by weight of the resin.
9. The resin of claim 6 wherein the resin contains from 1.3 to 2 moles of ethyleneurea per mole of glutaraldehyde and has a pH of about 8.5 to 10.5.
10. An article comprising a body of wood products bonded together by the addition thereto, prior to curing, of an ethyleneurea-glutaraldehyde resin having a molar ratio of ethyleneurea to glutaraldehyde of from about 0.3 to 3.5.
11. The article of claim 10 wherein the wood products are bonded together as a panel, the molar ratio of ethyleneurea to glutaraldehyde in the resin is from about 1.3 to 2.0, the pH of the resin is from about 7.5 to 12.5, and the resin has a solids content of from about 45% to 75% by weight of the resin.

12. An article comprising a body of wood products bonded together by the addition thereto, prior to curing, of a urea-ethyleneurea-glutaraldehyde resin having from about 0.1 to 2 moles of urea and 0.3 to 3.5 moles of ethyleneurea for each mole of glutaraldehyde.

13. The article of claim 12 wherein the wood products are bound together as a panel, the molar ratio of ethyleneurea to glutaraldehyde in the resin is from about 1.3 to 2, the pH of the resin is from about 7.5 to 12.5, and the resin has a solids content of from about 45% to 75% by weight of the resin.

14. A composite panel of wood particles bonded together by the addition thereto, prior to curing, of an ethyleneurea-glutaraldehyde resin having a molar ratio of ethyleneurea to glutaraldehyde of from about 0.3 to 3.5.

15. The panel of claim 14 wherein the resin includes up to about 2 moles of urea per mole of glutaraldehyde.

16. The panel of claim 14 wherein the resin has a pH of about 7.5 to 12.5 and a solids content of about 45% to 75% by weight of the resin.

17. The panel of claim 14 wherein the resin includes at least 0.1 moles of urea per mole of glutaraldehyde, the resin has a pH of about 7.5 to 12.5 and a solids content of about 45% to 75% by weight of the resin.

18. A method for the manufacture of an ethyleneurea-glutaraldehyde resin which comprises combining ethyleneurea with glutaraldehyde at a pH of about 6.5 to 10.5.

19. The method of claim 18 wherein from about 0.3 to 3.5 moles of ethyleneurea are combined with each mole of glutaraldehyde at a pH of about 8.5 to 10.5.

20. A method for the manufacture of a urea-ethyleneurea-glutaraldehyde terpolymer resin which comprises reacting a member selected from the group consisting of glutaraldehyde, ethyeneurea-glutaraldehyde resin, urea-glutaraldehyde condensate, and mixtures thereof with a member selected from the group consisting of urea, ethyleneurea, and mixtures thereof, to prepare a terpolymer resin having a molar ratio of from about 0.3 to 3.5 moles of ethyleneurea for each mole of glutaraldehyde and from about 0.1 to 2 moles of urea for each mole of glutaraldehyde and the reaction is conducted at a pH of from about 6.5 to 10.5.

21. The method of claim 20 wherein the terpolymer has a molar ratio of 1.3 to 2.0 moles of ethyleneurea and 0.3 to 1.8 moles of urea per mole of glutaraldehyde and wherein water is removed during the reaction by distillation.

22. A method for bonding lignocellulosic material under heat and pressure which comprises:
   a. applying an adhesive to said lignocellulosic material wherein the adhesive comprises an ethyleneurea-glutaraldehyde resin having a molar ratio of ethyleneurea to glutaraldehyde of from about 0.3 to 3.5 and up to 2 moles of urea per mole of glutaraldehyde; and
   b. consolidating said lignocellulosic material and curing the resin.

23. The method of claim 22 wherein the quantity of urea is at least 0.1 mole of urea per mole of glutaraldehyde.

24. The method of claim 22 wherein the lignocellulosic material is a member selected from the group consisting of wood flakes, wood particles, wood fibers, wood shavings, wood veneers, and mixtures thereof, and said lignocellulosic material is consolidated into boards.

25. The method of claim 22 wherein the molar ratio of ethyleneurea to glutaraldehyde is from about 1.3 to 2.0 and the resin has a pH of about 7.5 to 12.5 and a resin solids content of from about 45% to 75%.

26. A method for making particleboard which comprises the steps of:
   a. applying to a furnish a curable ethyleneurea-glutaraldehyde resin binder formulation having a pH of about 7.5 to 12.5, a resin solids content of from about 45% to 75% by weight of said resin; and
   b. then bonding said furnish and applied binder formulation under heat and pressure and curing said resin binder.

* * * * *